Figure 1:
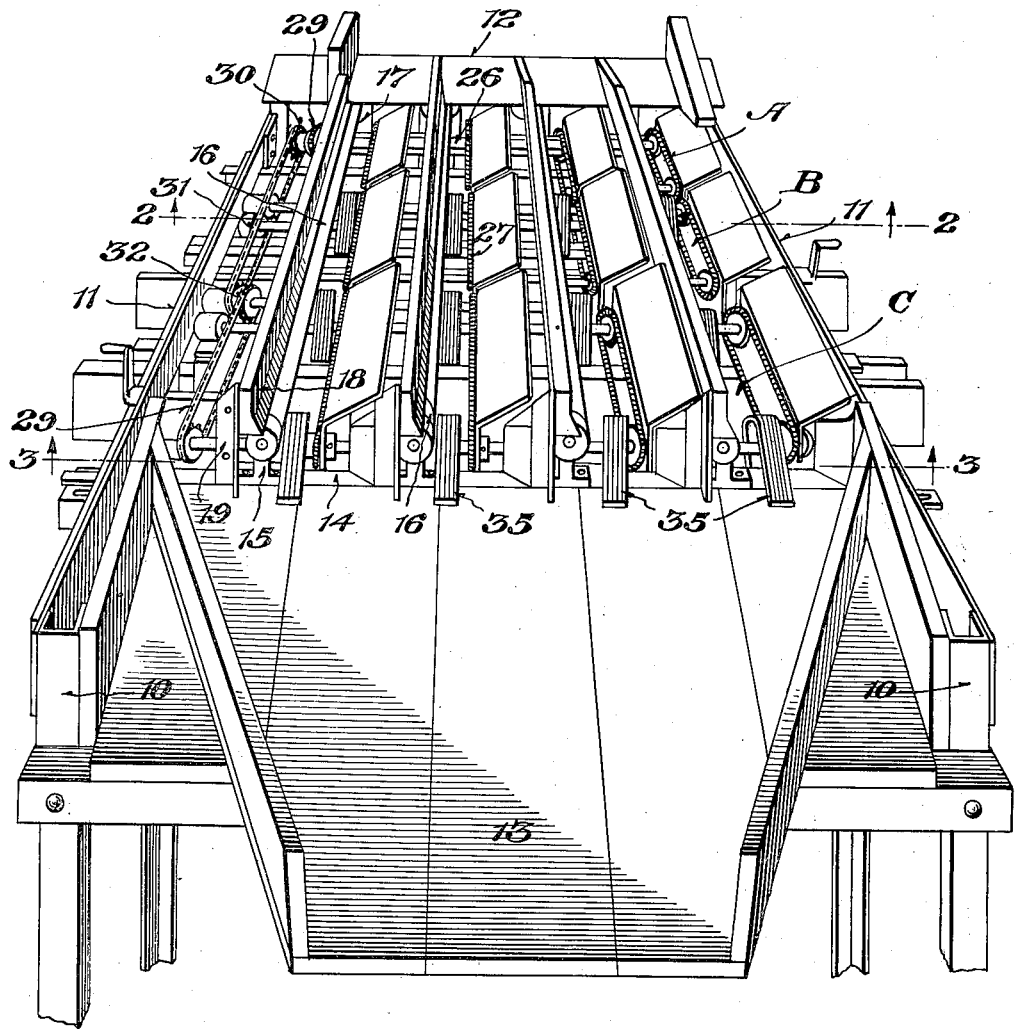

May 27, 1941.  E. M. WAYLAND  2,243,516
FRUIT SIZING MACHINE
Filed July 14, 1938  2 Sheets-Sheet 1

Inventor
Edwin M. Wayland,

His Attorneys

May 27, 1941.  E. M. WAYLAND  2,243,516
FRUIT SIZING MACHINE
Filed July 14, 1938  2 Sheets-Sheet 2
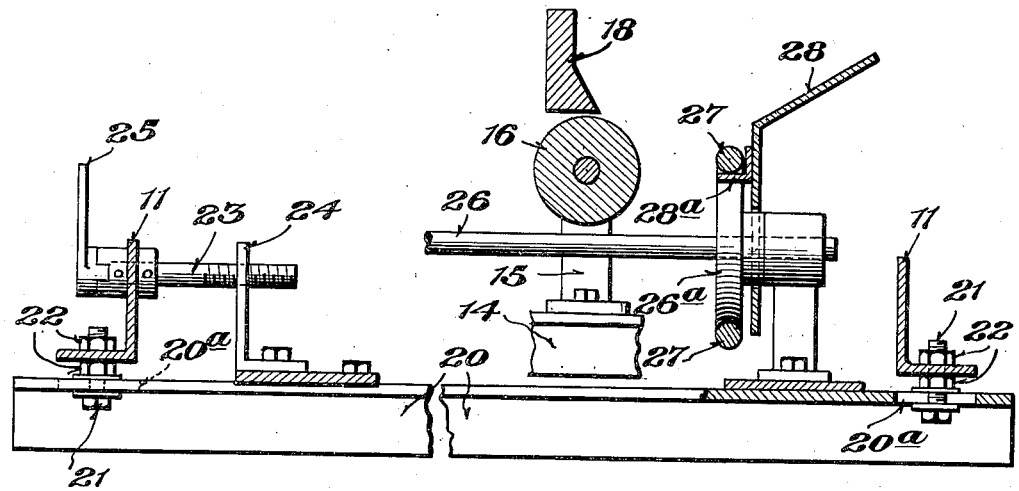
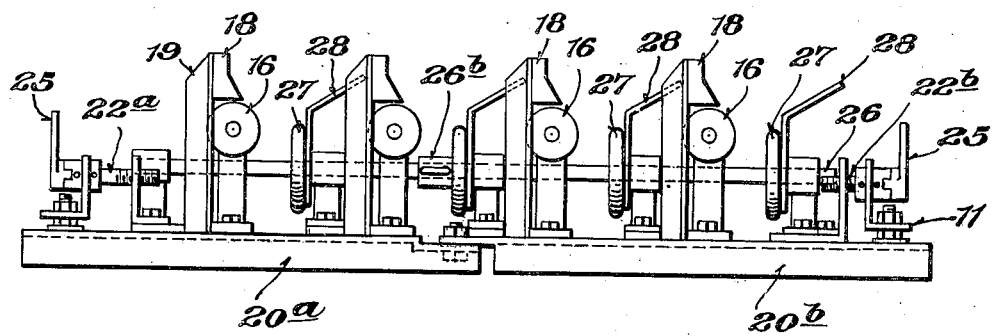
Inventor
Edwin M. Wayland, Patented May 27, 1941

2,243,516

UNITED STATES PATENT OFFICE 2,243,516

FRUIT SIZING MACHINE

Edwin M. Wayland, Covesville, Va.

Application July 14, 1938, Serial No. 219,228

7 Claims. (Cl. 209—103)

The present invention relates to machines for sizing and grading fruits and the like and particularly to machines for sizing fruits on their minimum diameter, such as peaches.

More specifically the invention aims to improve that type of fruit grading machine employing an upwardly revolving roll and a forwardly moving endless feeding and sizing belt.

Heretofore such machines have usually employed a stepped sizing roll or a plurality of aligned roll sections independently adjustable toward and from the feeding belt. The use of the stepped sizing roll limits the adjustment of the machine to definite sizes and in the case of machines having individually adjustable roll sections there often is required more complicated adjusting mechanism.

With a view to simplifying the construction of the machine as well as providing a machine having an increased capacity for more different sizes of fruit grading, I employ a continuous roll of uniform diameter tending to rotate the fruit in combination with a plurality of endless belt sections disposed alongside the roll and individually adjustable relative thereto to provide a plurality of grading sections of desired size for grading fruit to the desired diameter.

One preferred embodiment of the invention is illustrated in the accompanying drawings, in which Fig. 1 is a perspective view of the machine as viewed from the delivering end;

Fig. 2 is a fragmental transverse sectional view as taken on the line 2—2 of Fig. 1; and Fig. 3 is a similar sectional view taken on the line 3—3 of Fig. 1.

In the particular embodiment of the invention illustrated in the drawings, there is a suitable supporting framework 10, providing side rails 11, a receiving board 12, and a delivery board 13. Transverse supports 14, extending between and supported on the side rails 11, provide a support for end bearings 15, in which is journalled one or more rolls 16 extending the length of the machine between the receiving and delivery boards 12—13. The roll or rolls 16 are preferably continuous and of a uniform diameter throughout the length thereof, and advantageously may be formed of a single length of metal tubing. The rolls may be rotated by any suitable means, as for example, a quarter turn V belt drive 17 on grooved sheaves, connected to a common power source (not shown). These rolls 16 remain in a fixed position without adjustment.

One side of the roll 16 constitutes a longitudinal side of a grading channel, and in order to grade the fruit on its minimum diameter, the direction of rotation of the fruit supporting side of the roll is upwardly so as to rotate the fruit on the axis of its maximum diameter. In order to prevent the fruit from passing over the roll, a guide board 18 extends longitudinally over the roll 16, and may be supported by supports 19 attached to the transverse supports 14.

The space between the receiving board 12 and delivery board 13 is divided into a plurality of grading or sizing sections, herein illustrated as three in number, comprising a preliminary grading section A, in which is sorted all fruit below the first commercial grade; the next section B in which are sorted the first commercial size; and the third section C for sorting the second commercial size; the third commercial size being made up by the larger size fruit delivered over the delivery board 13.

Each grading section comprises a supplemental frame rigid in itself, supported from the side rails 11 above by means of bolts 21 passing loosely through slots 21ª in the sides of the frames 20. The bolts 21 are secured fast to the side rail 11 by clamping nuts 22 so as to permit the supplemental frames 20 to be adjusted freely with a movement exactly at right angles to the rolls 16, but in no other direction. Proper adjustment or positioning of the supplemental frames 20 is effected by means of a bolt 23 journalled in the side rails 11 and threaded into a bracket 24 on the supplemental frame. The bolts 23 may, if desired, be operated by suitable means or handle 25 but I prefer to use a hollow hexagon threaded bolt 23 which may be operated only by a specially shaped wrench held by one in authority.

Mounted above the supplemental frames 20 and extending parallel with the side rails 21 thereof are shafts 26, each carrying a series of pulleys 26ª, over which are trained endless round belts 27 preferably formed of round wire. Each of these wire belts is adapted to cooperate with a roll 16 to form the opposite side of the grading channel throughout the length of the respective grading sections A, B or C. A metal guide shield 28 supported by a supplemental frame is provided for each belt section and preferably has one inclined part extending above the belt to guide the fruit into the channel provided by the belt and cooperating roll surface.

A suitable support for the upper or active rim of the belts 27 is provided by means of a metal bracket 28ª, herein illustrated as an angle bar, preferably of brass, secured to the shield 28, and having an horizontally extending portion underlying the upper run of the belt throughout substantially its length. This construction aids in maintaining the active or sizing run of the belts in a predetermined adjusted position and when the bracket 28ª becomes worn, a new one may readily be installed.

As will be apparent, there is one belt section with its associated guide shield 28 for each roll, so that throughout each grading section A, B and C there is provided one or more grading channels, depending upon the number of rolls and belt sections, each presenting an upwardly moving rotating surface for rotating the fruit, and a horizontally travelling surface for moving the fruit.

A single adjustment of the supplemental frame 20 in the grading section A is sufficient to position all of the belts 27 and shield 28, an equal distance from their respective rolls, so as to grade out all fruit below the first commercial size throughout the width of the machine. Similarly by a single adjustment of the supplemental frame 20 of section B, all of the belts of that frame may be adjusted with respect to the rolls 16 to grade out the first commercial size, or if desired, to grade out the fruit below commercial size, this providing a double elimination of fruit under a commercial size.

The belts 27 are driven by any suitable means, as for example by a chain and sprocket drive 29 (see Fig. 1). Preferably the initial drive is to the first shaft 26 on frame 20 in section A, which drives all of the belts on the frame of that section. A second sprocket 30 on said shaft drives through chain 31 a larger sprocket 32 on one of the shafts 26 on section B frame, and similarly there is a chain drive from said second shaft to a larger sprocket on one of the shafts of section C frame. Thus it will be noted that the belts 27 move at a progressively slower speed respectively, in sections A, B and C, with the result that the larger and finer fruit travels slower and slower as it progresses to successive sections which is in the interest of better sizing and gentler handling.

It is sometimes desirable, where conveying and distributing belts permit, to adjust the machine so that the largest or No. 1 grade fruit may be distributed from both the end and one side of the machine. Accordingly, one half of the last grading section (section C as illustrated herein) should be adjusted to convey the larger fruit to the delivery board and the other half to pass the larger size fruit to suitable conveyors arranged below the rolls and belts for conveying the fruit from one side. To accomplish this the supplemental frame for the last section is made in two halves 20ª and 20ᵇ (see Fig. 3) each independently adjustable transversely of the main frame 10 by separate adjusting means 22ª and 22ᵇ. To permit this adjustment of one part of the supplemental frame relative to the other, the shafts 26 may be splined as by being joined by slotted sleeves 26ᵇ.

The ends of the grading channels for each section may be bridged by strips of felt 35, suitably supported by the frame 10, and extending over the sections of the shafts 26 underlying each channel. These strips 36 prevent the fruit from falling through where not desired, as well as from damage by engagement by the shafts 26.

While I have illustrated and described a machine having four grading rolls or channels with three grading sections, it is to be understood that the invention is not to be so limited but that, on the contrary, any desired number of grading channels and sections may be employed.

I claim:

1. A fruit sizing machine having one or more fruit sizing channels, one side of said channel comprising an upwardly moving surface of a continuous uniform diameter roll, and the opposite sides of said channel comprising a plurality of relatively short endless belts, means for adjusting said belts relative to said roll, and means for rotating said belts in unison at different speeds to progressively decrease the rate of travel of the fruit through the machine.

2. A fruit sizing machine having one or more fruit sizing channels, one side of said channel comprising an upwardly moving surface of a continuous uniform diameter roll, and the opposite side of said channel comprising a plurality of relatively short endless belts, a belt driving shaft extending transversely across the channel and a stationarily mounted fruit deflecting means in the channel overlying said shaft between the roll and belt adjacent the rear end of each belt.

3. A fruit sizing machine comprising a main frame, a plurality of elongated rolls of uniform diameter rotatably mounted in fixed position on said frame, said rolls being of sufficient length to extend through a plurality of grading sections, a supplemental frame for each section adjustably mounted on said main frame, a plurality of endless belts, one for each section, mounted on said supplemental frame, means for driving said belts so that the belts of successive sections move at progressively decreased speeds, means for adjusting said supplemental frames transversely of the machine independently of each other to simultaneously adjust the position of each belt on said supplemental frame with relation to its cooperating roll.

4. A fruit sizing machine comprising a main frame, a plurality of elongated rolls of uniform diameter rotatably mounted in fixed position on said frame, said rolls being of sufficient length to extend through a plurality of grading sections, a supplemental frame for each section adjustably mounted on said frame, a plurality of endless belts, one for each roll, mounted on said supplemental frame, means for driving said belts at different speeds to progressively decrease the rate of travel of the fruit through the machine, a bracket on each of said supplemental frames, an adjusting member rotatably journaled in said main frame and having threaded engagement with said bracket whereby said supplemental frame may be adjusted transversely of the machine independently of each other to simultaneously adjust the position of each belt on said supplemental frame with relation to the cooperating roll.

5. A fruit sizing machine comprising a main frame, a plurality of elongated rolls of uniform diameter rotatably mounted in fixed position on said frame, said rolls being of sufficient length to extend through a plurality of grading sections, a supplemental frame for each section adjustably mounted on said main frame, a plurality of endless belts, one for each roll mounted on said supplemental frame, a deflecting guide associated with each belt, a bracket on each of said supplemental frames, an adjusting member rotatably journaled in said main frame and having a threaded engagement with said bracket whereby said supplemental frames may be adjusted transversely of the machine independently of each other to simultaneously adjust the position of each belt and shield on said supplemental frames with relation to the cooperating roll, and means for driving said belts at different speeds to progressively decrease the rate of travel of the fruit through the machine.

6. A sizing machine comprising a supporting main frame providing a fruit receiving board, a fruit delivery board and horizontally disposed side rails between said boards, a plurality of rolls of uniform diameter rotatably mounted in fixed position on said frame, said rolls being of a length to extend from said receiving board to the delivery board, a plurality of supplemental frames underlying said rolls and defining a successive series of grading sections from the receiving end to the delivery end, a plurality of endless belts movably mounted on each of said supplemental frames, there being one belt on each frame for each roll, means for driving the belts in unison at different speeds to progressively decrease the rate of travel of the fruit through the machine, and means for independently adjusting said supplemental frames transversely of the machine.

7. A sizing machine comprising a supporting main frame providing a fruit receiving board, a fruit delivery board and horizontally disposed side rails between said boards, a plurality of rolls of uniform diameter rotatably mounted in fixed position on said frame, said rolls being of a length to extend from said receiving board to the delivery board, a plurality of supplemental frames underlying said rolls and defining a successive series of grading sections from the receiving end to the delivery end, a plurality of endless belts movably mounted on each of said supplemental frames, there being one belt on each frame for each roll, means for driving the belts in unison at different speeds to progressively decrease the rate of travel of the fruit through the machine, a single adjustment for each of certain of said supplemental frames for simultaneously adjusting all of the belts on the particular frame with relation to the rolls according to the size of fruit to be graded in that particular section, the supplemental frame defining the last grading section being formed in two separately adjustable parts, and separate means for adjusting each part of the last supplemental frame.

EDWIN M. WAYLAND.